United States Patent
Wang et al.

(10) Patent No.: US 12,067,218 B2
(45) Date of Patent: Aug. 20, 2024

(54) APPLICATION PAGE DISPLAY METHOD AND APPARATUS

(71) Applicant: BEIJING ZITIAO NETWORK TECHNOLOGY CO., LTD., Beijing (CN)

(72) Inventors: Xiaolu Wang, Beijing (CN); Yue Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/457,580

(22) Filed: Aug. 29, 2023

(65) Prior Publication Data
US 2023/0400966 A1 Dec. 14, 2023

Related U.S. Application Data

(63) Continuation of application No. PCT/CN2022/078520, filed on Mar. 1, 2022.

(30) Foreign Application Priority Data

Mar. 1, 2021 (CN) .......................... 202110227882.5

(51) Int. Cl.
*G06F 3/0482* (2013.01)
*G06F 3/0483* (2013.01)
(Continued)

(52) U.S. Cl.
CPC .......... *G06F 3/0483* (2013.01); *G06F 3/0482* (2013.01); *G06F 3/0484* (2013.01); *G06F 3/165* (2013.01); *G06F 3/0488* (2013.01)

(58) Field of Classification Search
CPC .............................................. G06F 3/048–05
See application file for complete search history.

(56) References Cited

U.S. PATENT DOCUMENTS

| 10,298,874 B1* | 5/2019 | Lewis | G06F 3/0485 |
| 2013/0291018 A1* | 10/2013 | Billings | H04L 51/52 |
| | | | 725/46 |

(Continued)

FOREIGN PATENT DOCUMENTS

| CN | 108021307 A | 5/2018 |
| CN | 110753902 A | 2/2020 |

(Continued)

OTHER PUBLICATIONS

Howfinity, "How to Use Instagram Explore Page", published on Jul. 2, 2018, available at <<https://www.youtube.com/watch?v=6dK6EH1adhl>>, 9 pages (Year: 2018).*

(Continued)

*Primary Examiner* — Daniel Rodriguez
(74) *Attorney, Agent, or Firm* — HSML P. C.

(57) ABSTRACT

A method for displaying an application page includes: receiving a first operation executed by a user on a first page of a first application, the first operation being used for entering a second page of the first application; in response to receiving the first operation, displaying on the second page a first label, a second label, and a first area corresponding to the first label, and playing an information stream corresponding to a first option in the first area, the first label being used for identifying the function of each option in the first area; and displaying on the second page the first label, the second label, and a second area corresponding to the second label, and playing an information stream corresponding to a second option in the second area, in the case that a preset condition is met.

18 Claims, 15 Drawing Sheets

(51) Int. Cl.
*G06F 3/0484* (2022.01)
*G06F 3/16* (2006.01)
*G06F 3/0488* (2022.01)

(56) References Cited

U.S. PATENT DOCUMENTS

| | | | | |
|---|---|---|---|---|
| 2013/0332831 A1* | 12/2013 | Birnkrant | | G11B 27/28 |
| | | | | 715/838 |
| 2014/0025949 A1* | 1/2014 | Kay | | G06F 21/31 |
| | | | | 713/168 |
| 2014/0149918 A1* | 5/2014 | Asokan | | G06Q 30/0255 |
| | | | | 715/811 |
| 2014/0208268 A1* | 7/2014 | Jimenez | | H04N 21/6582 |
| | | | | 715/811 |
| 2018/0240069 A1* | 8/2018 | Yong | | G06F 3/04842 |
| 2018/0348967 A1 | 12/2018 | Kondrk et al. | | |
| 2019/0020983 A1* | 1/2019 | Thompson | | H04W 4/021 |
| 2019/0132648 A1* | 5/2019 | Zimmerman | | H04N 21/4325 |
| 2019/0149731 A1* | 5/2019 | Blazer | | G06F 3/011 |
| | | | | 348/39 |
| 2022/0019631 A1* | 1/2022 | Katz | | G06F 16/958 |
| 2023/0074468 A1* | 3/2023 | Wu | | G06F 3/0483 |

FOREIGN PATENT DOCUMENTS

| | | | |
|---|---|---|---|
| CN | 110764671 | A | 2/2020 |
| CN | 111147913 | A | 5/2020 |
| CN | 111432268 | A | 7/2020 |
| CN | 111694478 | A | 9/2020 |
| CN | 111767487 | A | 10/2020 |

OTHER PUBLICATIONS

Benjamin Chacon, "5 Things to Know About the Instagram Algorithm", published Jul. 16, 2017, available at <<https://later.com/blog/instagram-algorithm/>>, 18 pages (Year: 2017).*
International Search Report (with English translation) and Written Opinion issued in PCT/CN2022/078520, dated Apr. 27, 2022, 8 pages provided.

* cited by examiner

APPLICATION PAGE DISPLAY METHOD AND APPARATUS

This application is a continuation of International Application No. PCT/CN2022/078520, filed on Mar. 1, 2022 which claims priority to Chinese Patent Application No. 202110227882.5, titled "APPLICATION PAGE DISPLAY METHOD AND APPARATUS", filed on Mar. 1, 2021 with the China National Intellectual Property Administration, both of which are incorporated herein by reference in their entireties.

FIELD

The present disclosure relates to the field of computer technology and in particular to a method and apparatus for displaying an application page.

BACKGROUND

In an application (APP) page, a page corresponding to an entrance may display content of multiple function sets. The function set is constituted by one or more functions of the APP. However, the page corresponding to the entrance has a limited display space and often cannot fully display the content of multiple function sets, which is less attractive to users.

Hence, it is urgent problem to be solved how to fully display more contents of multiple function sets on a page corresponding to one entrance.

SUMMARY

In order to solve or at least partly solve the above technical problems, a method and apparatus for displaying an application page are provided according to the present disclosure.

In a first aspect, a method for displaying an application page is provided according to the present disclosure. The method includes:
  receiving a first operation performed by a user on a first page of a first application, where the first operation is configured to enter a second page of the first application, and the first page is different from the second page;
  displaying a first label, a second label, and a first area corresponding to the first label on the second page, and playing a feed flow corresponding to a first option in the first area, in response to receiving the first operation; wherein a function identified by the first label is different from a function identified by the second label; and
  switching from a display of the first area to a display of a second area corresponding to the second label on the second page and playing a feed flow corresponding to a second option in the second area, in a case that a preset condition is met.

With the method provided by the first aspect, in response to receiving the first operation performed by the user on the first page of the first application, the electronic device can display multiple labels and the first area corresponding to the first label on the second page and play the feed flow in the function set corresponding to the first area. In the case that a preset condition is met (e.g., after a preset duration, or in response to receiving the second operation performed by the user on the second label), the electronic device can display multiple labels and the second area corresponding to the second label on the second page, and play the feed flow in the function set corresponding to the second area. In this way, the space of one page is fully utilized to be compatible with the display of multiple function sets and the feed flow of one function set. Thus, the user can clarify the functions of function sets as much as possible, and can automatically or manually acquire the video content such as the content that the user is interested in or the current news in each function set, which is beneficial for the application program to display the function sets in an enriched and stereoscopic manner, and improves the user experience for the application program.

In a possible implementation, the preset condition includes: elapsing a preset duration, or receiving a second operation performed by the user on the second label.

In a possible implementation, the first area and the second area are located at the same position on the second page.

In a possible implementation, in a case that the first area further includes a third option different from the first option, the playing a feed flow corresponding to a first option in the first area includes: playing the feed flow corresponding to the first option in the first area; and displaying a picture image in a feed flow corresponding to the third option in the first area.

In a possible implementation, the method further includes: receiving a third operation performed by the user on the second page; and switching, in response to receiving the third operation, from a play of the feed flow corresponding to the first option in the first area and a display of the picture image in the feed flow corresponding to the third option in the first area, to a display of a picture image in the feed flow corresponding to the first option in the first area and a play of the feed flow corresponding to the third option in the first area.

In a possible implementation, the third operation is an operation of increasing a display size of the third option in the first area to be greater than or equal to a preset value; or the third operation is an operation of moving the third option to a preset position in the first area.

In a possible implementation, the preset position is a position of the feed flow corresponding to the first option in the first area, in a case of playing the feed flow corresponding to the first option and displaying the picture image in the feed flow corresponding to the third option.

In a possible implementation, the playing the feed flow corresponding to the option includes: playing images and sound of a video of the feed flow corresponding to the option; or playing the images of the video of the feed flow corresponding to the option.

In a possible implementation, the method further includes: receiving a fourth operation performed by the user on an option in the first area or the second area; and reducing, increasing or muting sound of a video of the feed flow corresponding to the option in the first area or the second area, in response to receiving the fourth operation.

In a possible implementation, the first label is the first one of labels on the second page, and the first option is the first one of options in the first area, the second option is the first one of options in the second area.

In a possible implementation, the label or option is displayed at a preset position on the second page.

In a possible implementation, the first label and the second label are displayed in a single line or in multiple lines on the second page.

In a possible implementation, the options of the first label and the second label are related to a historical browsing record of the user in the first application; and the first label and the second label are related to the historical browsing record of the user in the first application.

In a second aspect, an electronic device is provided according to the present disclosure. The electronic device includes: a memory and a processor. The memory is configured to store program instructions. The processor is configured to invoke program instructions in the memory to cause the electronic device to implement the method for displaying the application page according to the first aspect and any possible implementations of the first aspect.

In a third aspect, a computer storage medium is provided according to the present disclosure, including computer instructions. The computer instructions, when running on an electronic device, cause the electronic device to implement the method for displaying the application page according to the first aspect and any possible implementations of the first aspect.

In a fourth aspect, a computer program product is provided according to the present disclosure. The computer program product, when running on a computer, causes the computer to implement the method for displaying the application page according to the first aspect and any possible implementations of the first aspect.

In a fifth aspect, a chip system is provided according to the present disclosure, the chip system includes a processor. When the process executes computer instructions stored in the memory, the electronic device implements the method for displaying the application page according to the first aspect and any possible implementations of the first aspect.

BRIEF DESCRIPTION OF THE DRAWINGS

The drawings herein are incorporated into the specification and constitute a part of the specification, which show embodiments which comply with the present disclosure. The drawings and the specification are used as a whole to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Exemplarily, a method and apparatus for displaying an application page, a device, a computer storage medium and a computer program product are provided according to the present disclosure. Labels for multiple function sets are displayed on a page corresponding to one entrance of the application program, and the feed flow(s) corresponding to one or more options corresponding to one label is played, which makes full use of the page space and is compatible with the display of multiple function sets. Thus, the user can quickly and clearly understand the functions of function sets, and accurately acquire the content that the user is interested in, the current news or other content in the each function set, elevates the user experience for the application program.

In the present disclosure, a method for displaying an application page is implemented by an electronic device. The electronic device may be a tablet computer, a mobile phone (such as a folding screen mobile phone, a large-screen mobile phone, etc.), wearable device, vehicle-mounted device, augmented reality (AR)/virtual reality (VR) device, notebook computer, ultra-mobile personal computer (UMPC), netbook, personal digital assistant (PDA), and the internet of things (IOT) device such as smart TV, smart screen, high-definition TV, 4K TV, smart speaker, smart projector, etc. The specific type of electronic device is not limited in the present disclosure.

The type of the operating system is not limited in the present disclosure. For example, the operating system may be an Android system, Linux system, Windows system, iOS system, etc.

Based on the foregoing description, an electronic device is taken as an example in an embodiment according to the present disclosure to describe a method for displaying an application page in detail in combination with the drawings and application scenarios.

Figure 1A:
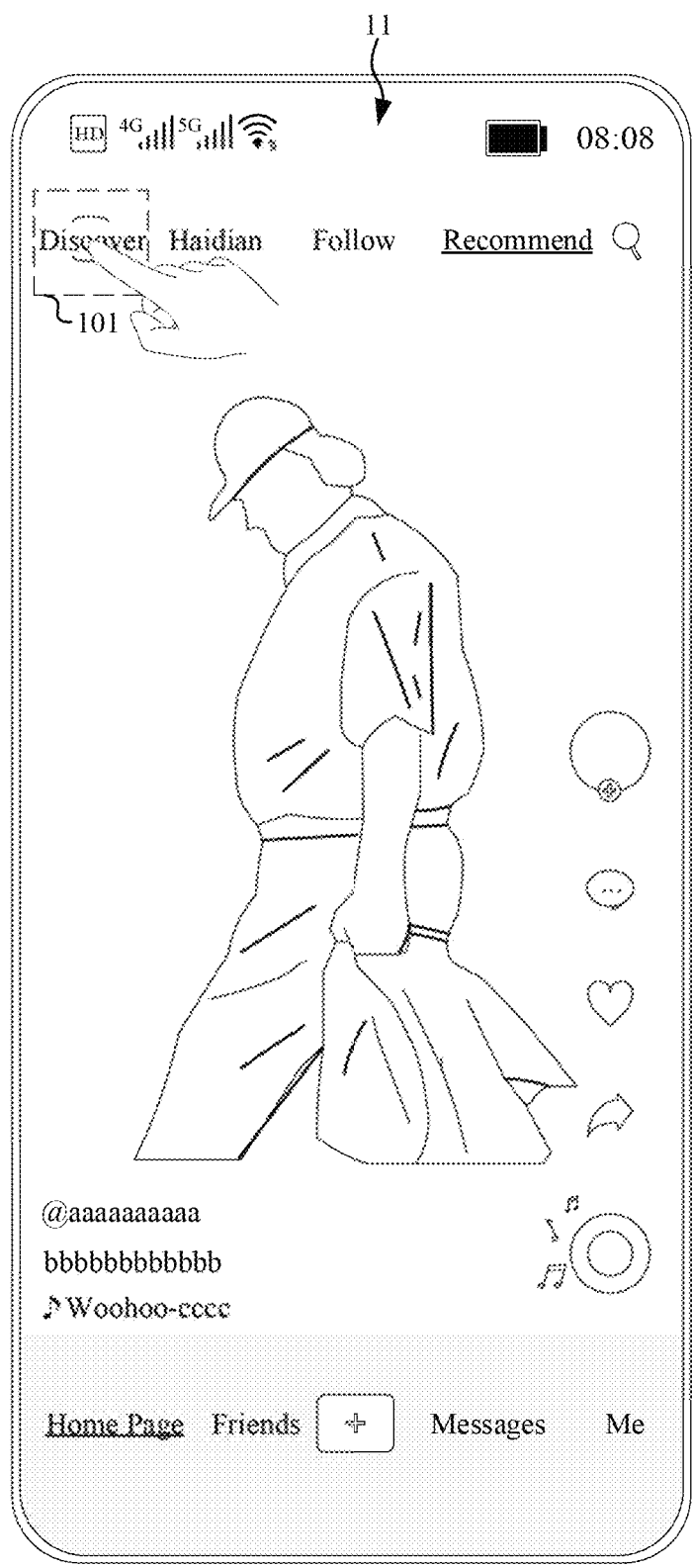
FIG. 1A to 1N are schematic diagrams of human-computer interaction interfaces according to an embodiment of the present disclosure.
Figure 1B:
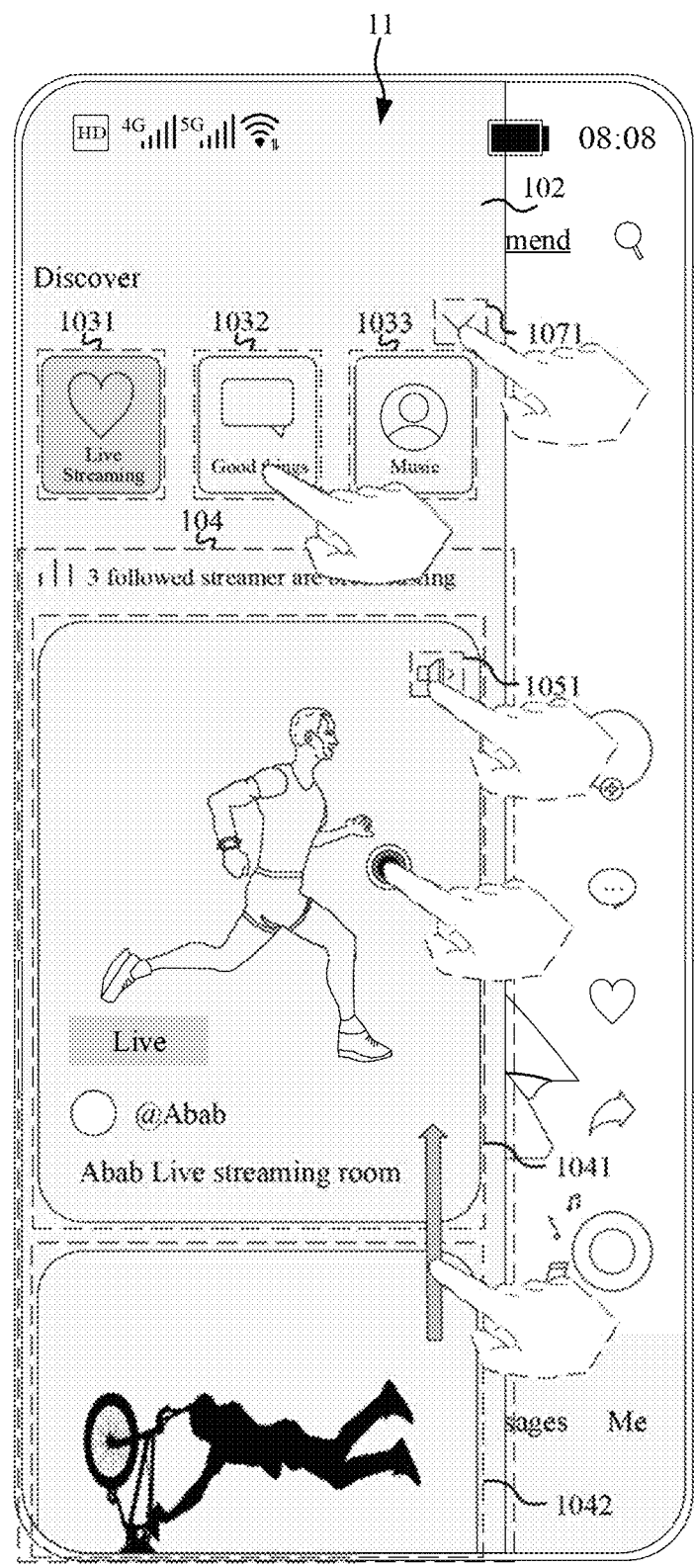
Figure 1C:
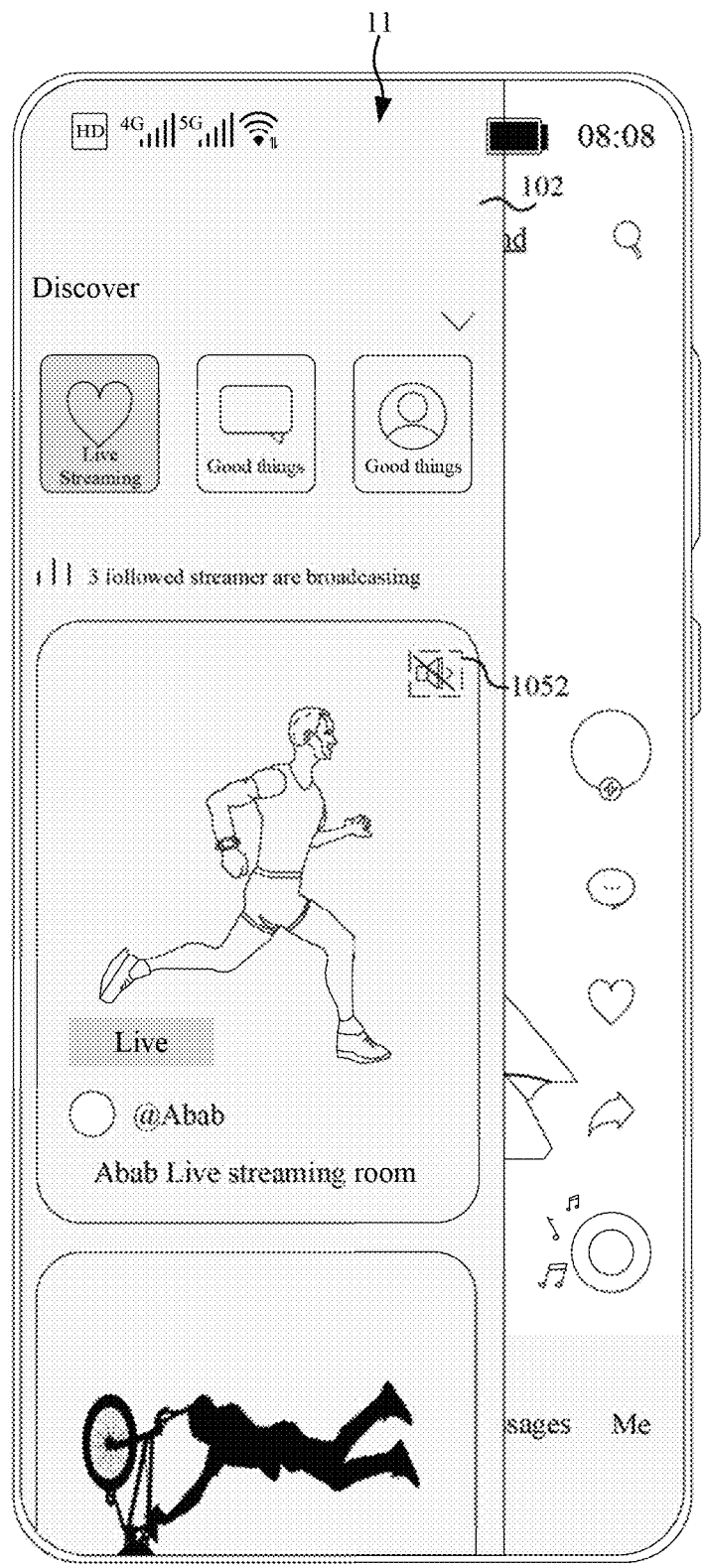
Figure 1D:
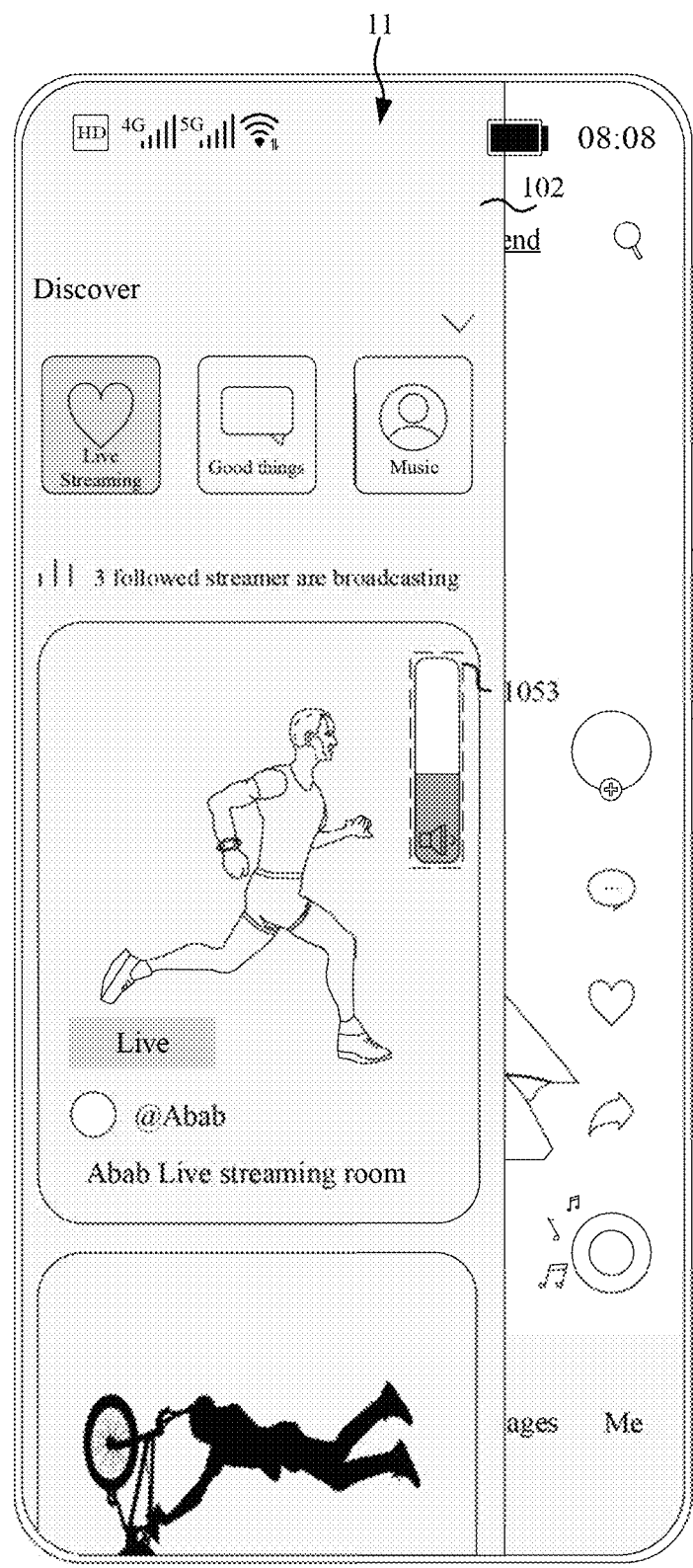
Figure 1E:
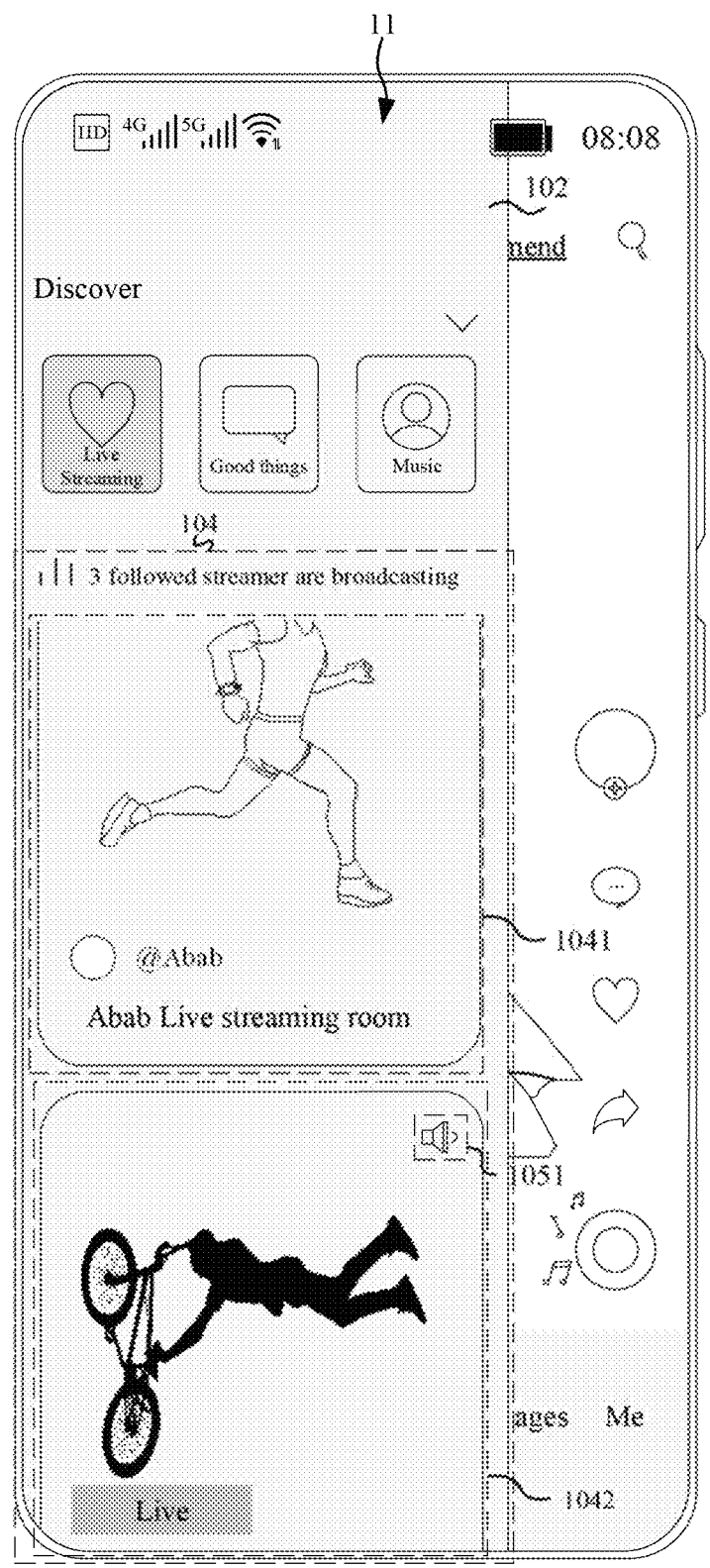
Figure 1F:
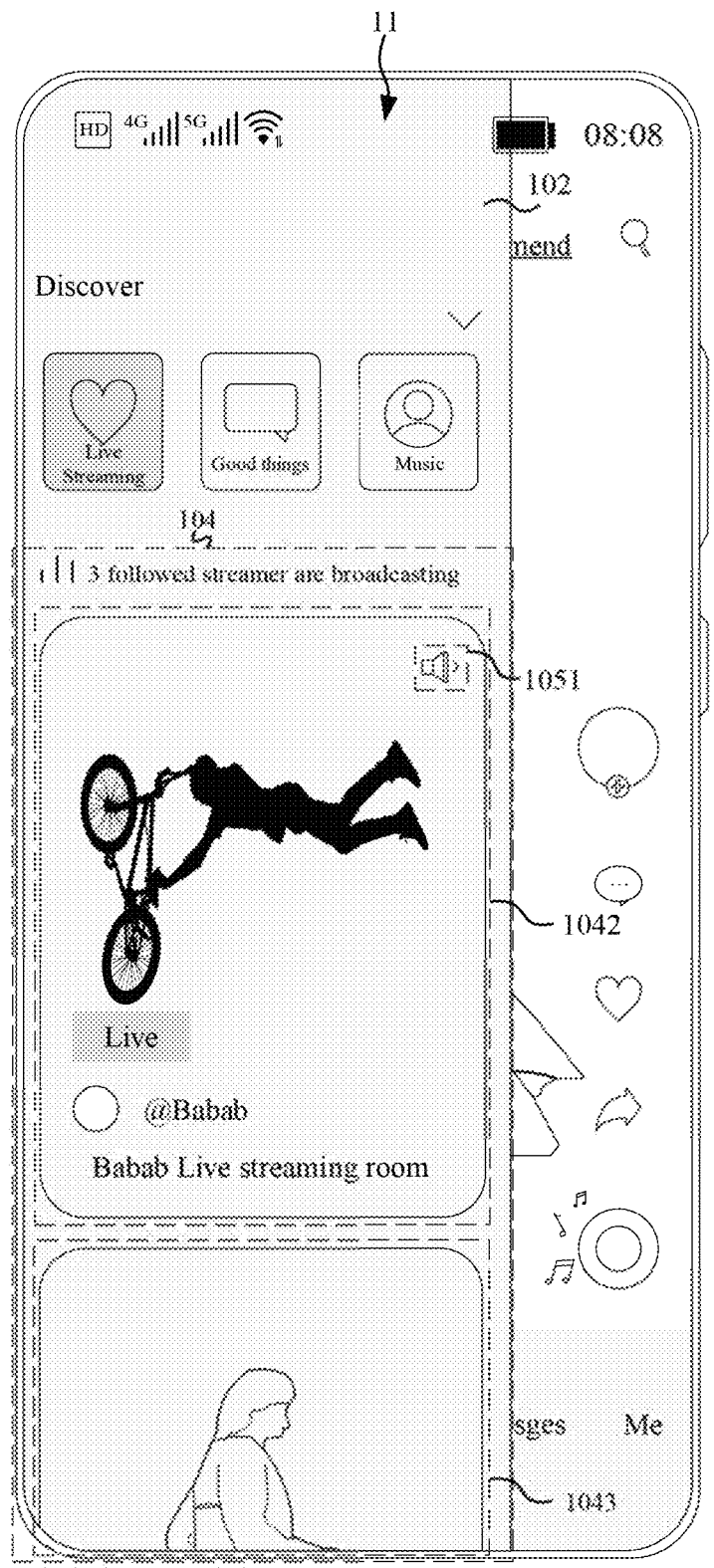
Figure 1G:
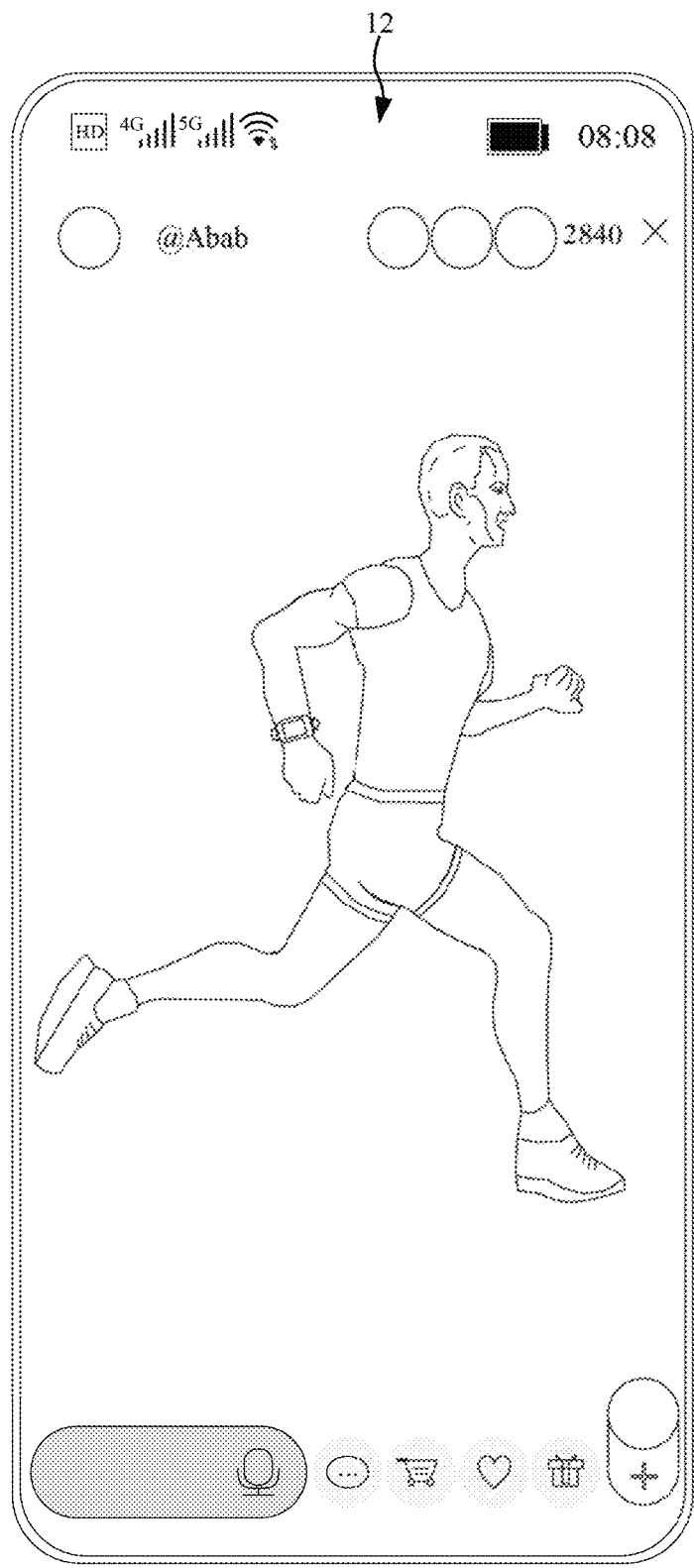
Figure 1H:
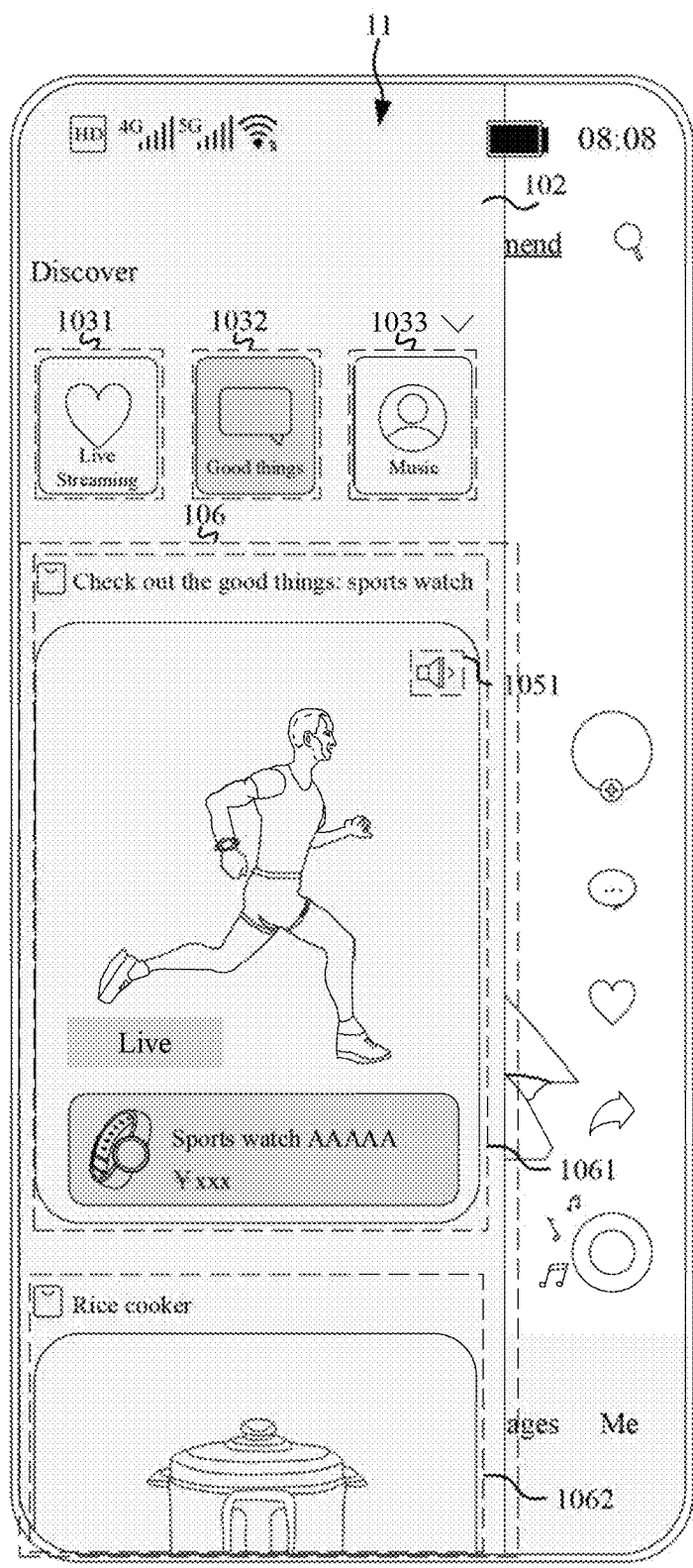
Figure 1I:
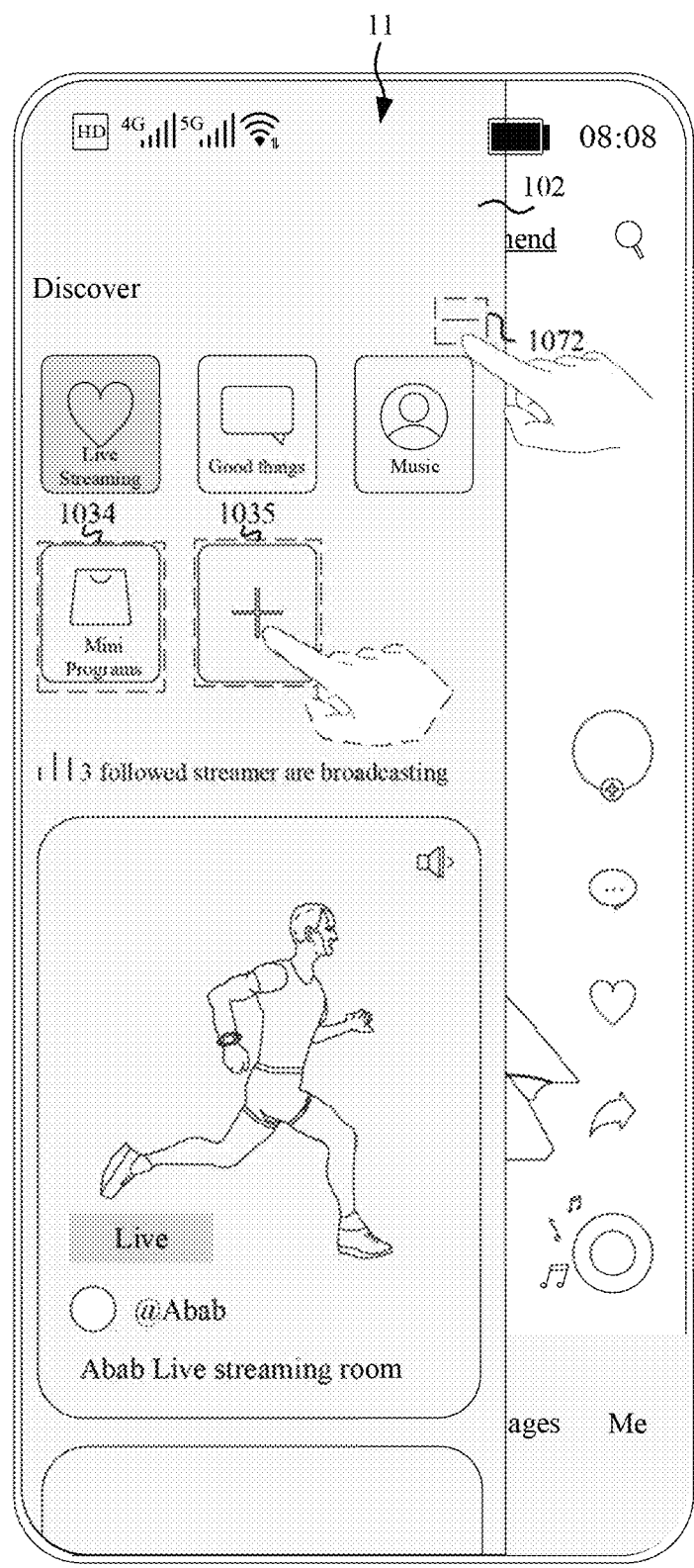
Figure 1J:
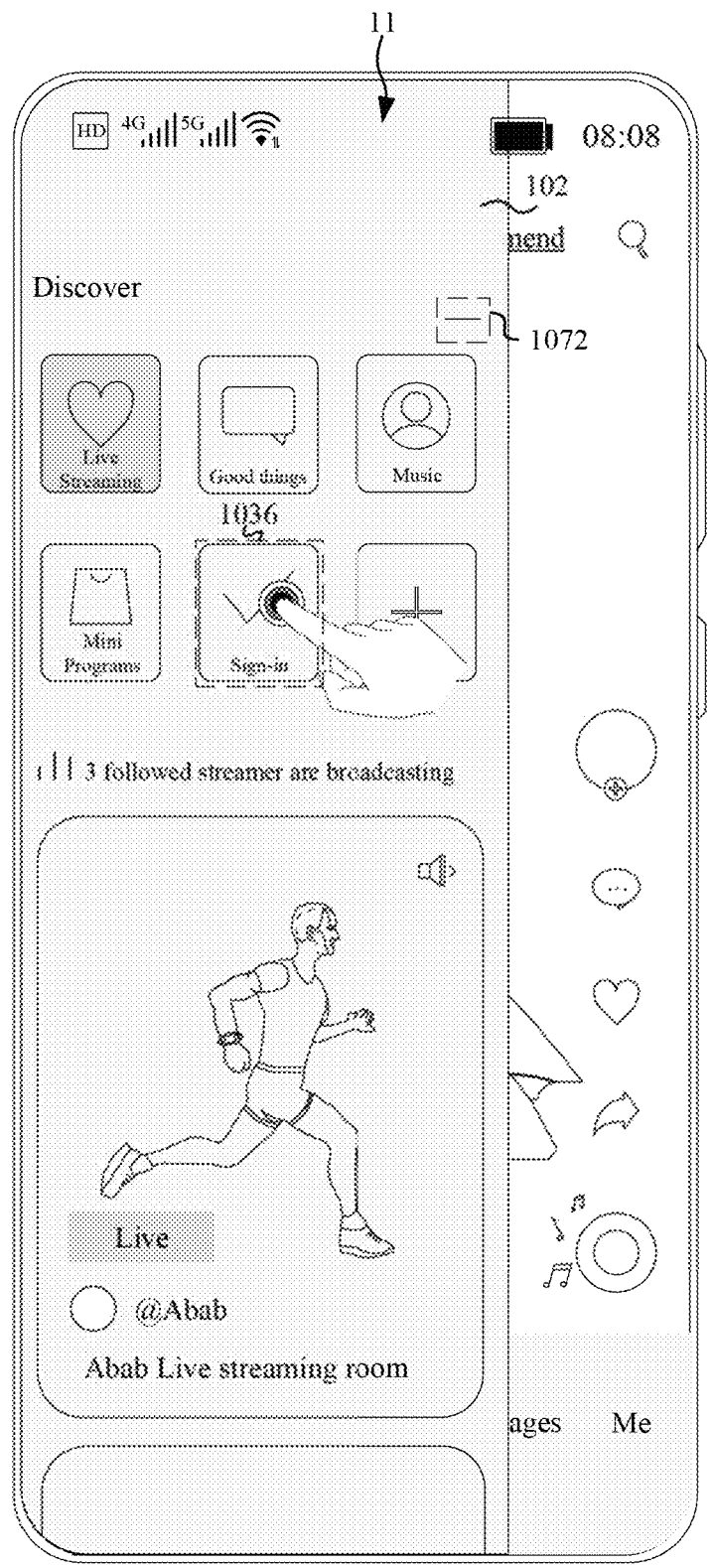
Figure 1K:
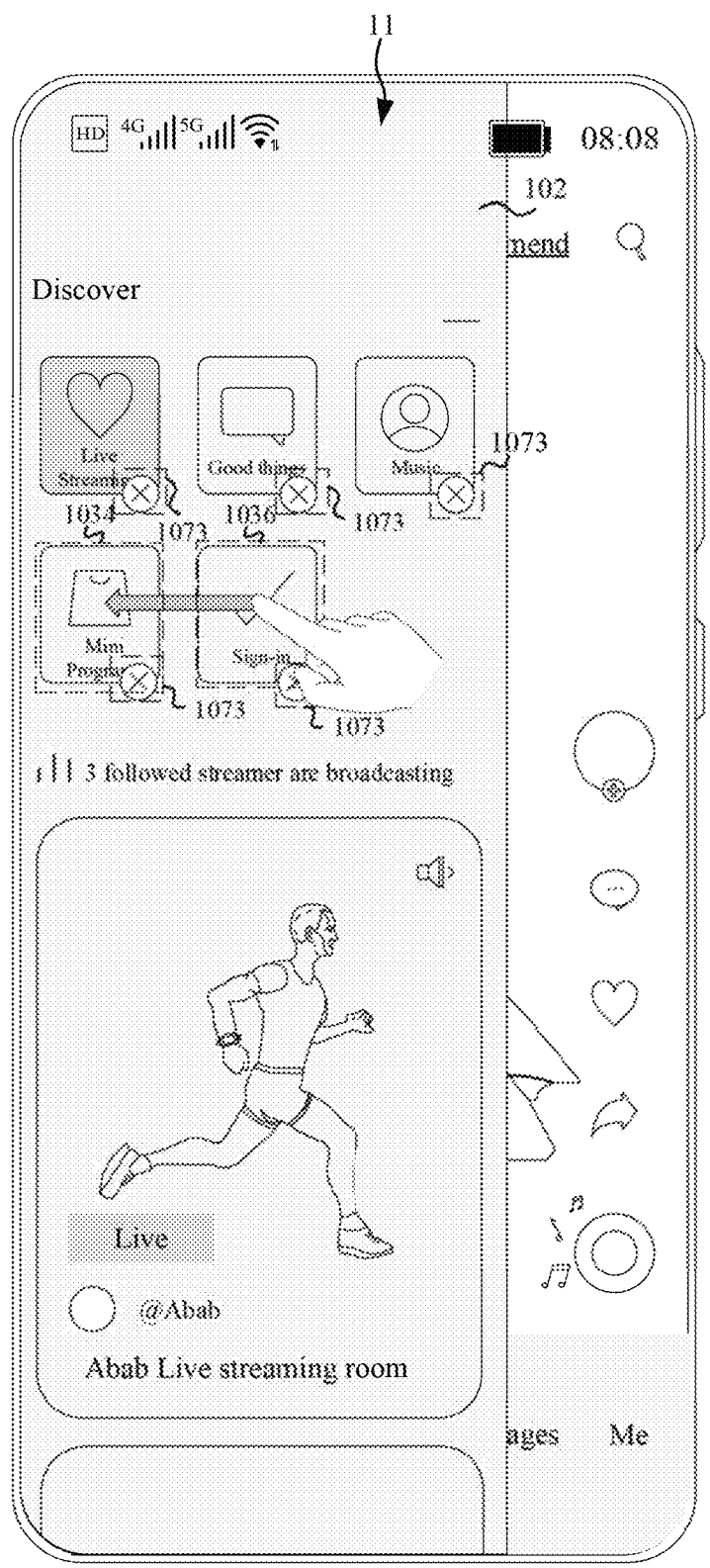
Figure 1L:
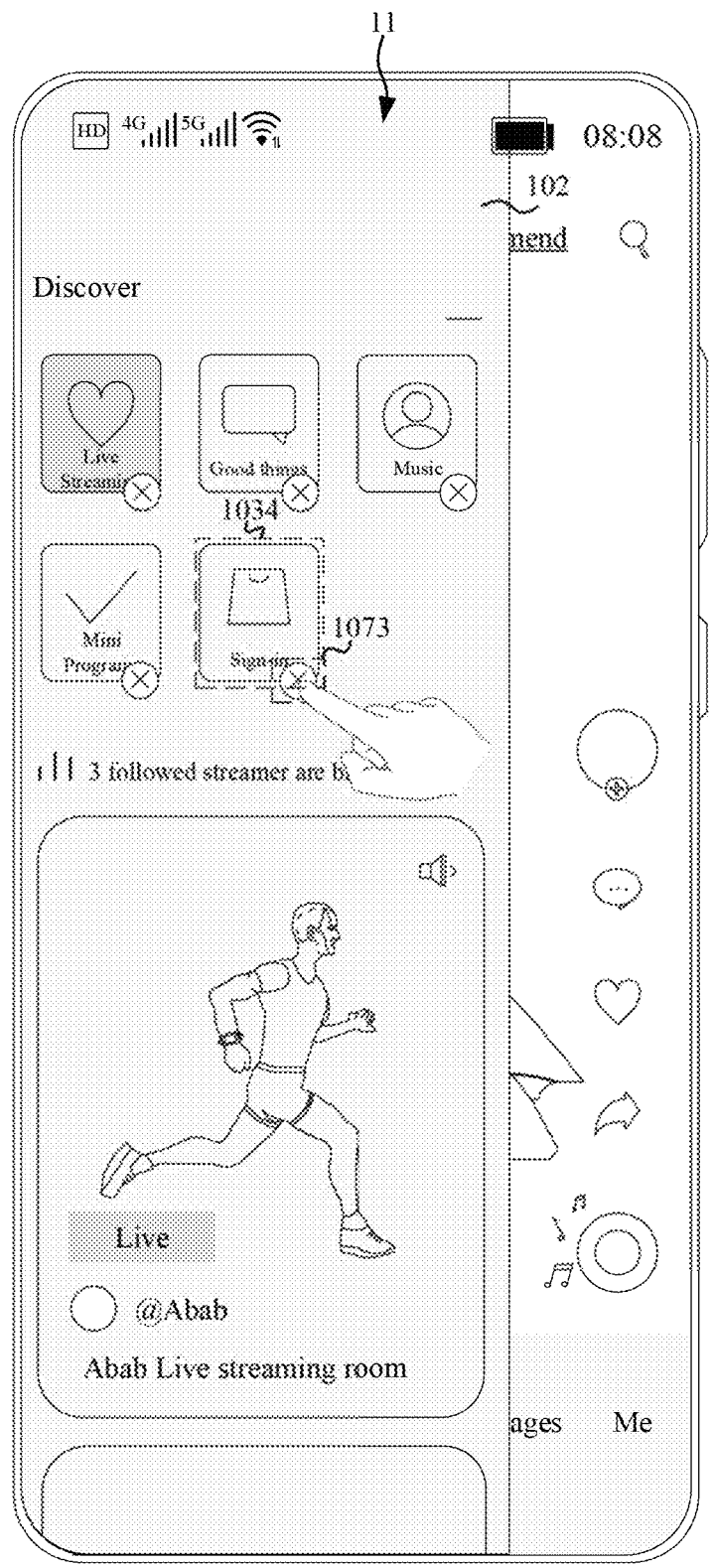
Figure 1M:
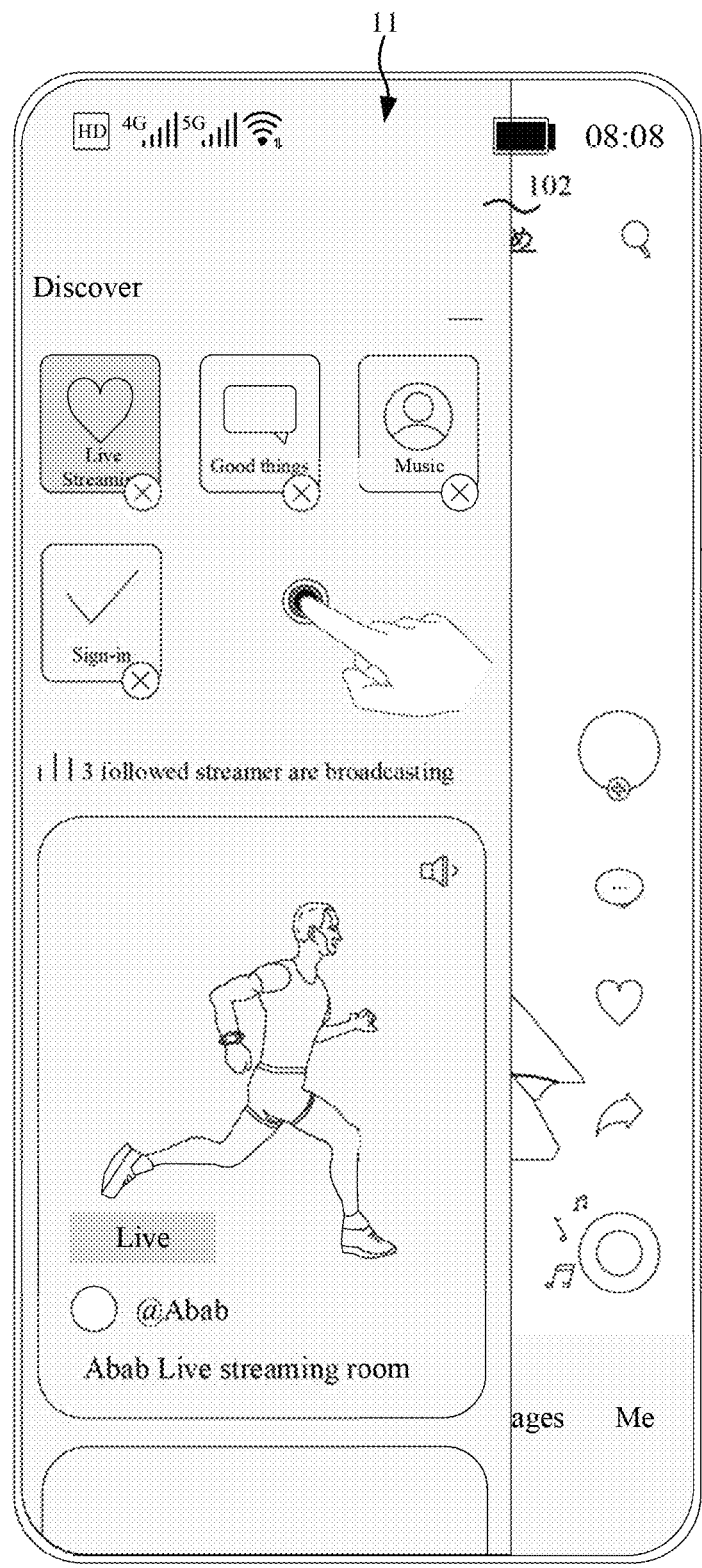
Figure 1N:
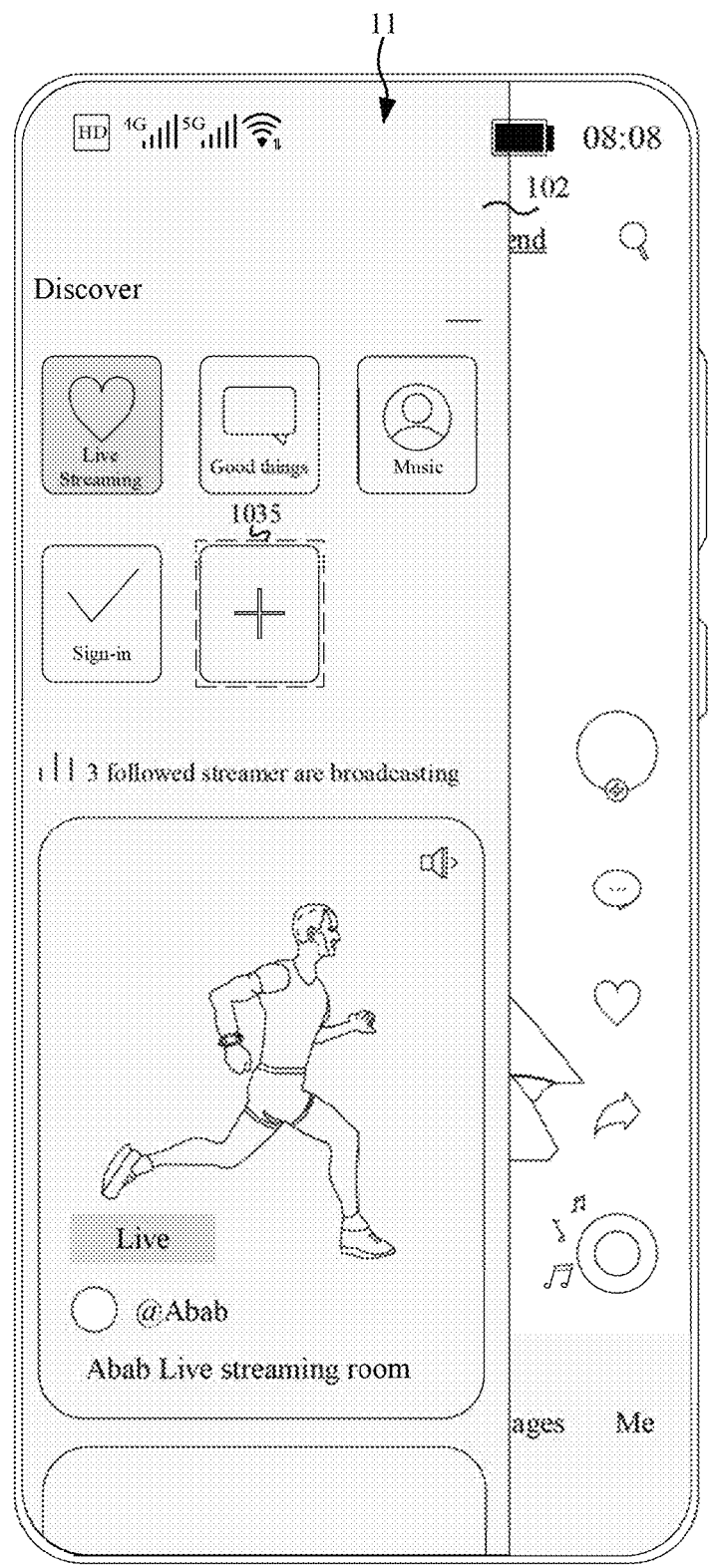

With reference to FIGS. 1A to 1N, a specific implementation process of a method for displaying an application page according to the present disclosure is provided. For the convenience of explanation, the electronic device is a mobile phone, and the short video social APP 1 (hereinafter referred to as application 1) is installed in the mobile phone as an example for illustration, in the FIGS. 1A to 1N.

FIGS. 1A to 1N are schematic diagrams of human-computer interaction interfaces according to an embodiment of the present disclosure.

The application 1 may display a user interface 11 shown in FIG. 1A on the mobile phone. The user interface 11 is used to display a home page of the application 1. The application 1 performs a certain function in the home page of application 1, such as playing multimedia information (such as short videos). The user interface 11 may include: a control 101. The control 101 is used to enter a discovery page of the application 1. The discovery page is used to present three function sets of the application 1, i.e., a live streaming room, a good things recommendation and a music recommendation.

After the application 1 receives an operation of the user on the user interface 11 shown in FIG. 1A, such as clicking the control 101, the application 1 may display the window 102 shown in FIG. 1B on the user interface 11. The window 102 is used to display the discovery page of application 1.

The window 102 is displayed in a sidebar style and covers a partial area of the user interface 11. It should be noted that the area of the user interface 11 covered with the window 102 may be an area in the user interface 11, and a parameter such as a size, a position, a shape, and a background color of the area is not limited in the present disclosure.

As shown in FIG. 1B, the window 102 may include: a label 1031, a label 1032, a label 1033 and a display area 104.

The parameter, such as the shape, the size, and the color, of each label is not limited in the present disclosure. Each label may be displayed in the form of an icon, a text, a picture, a video, etc. For example, the label may be displayed by using a default icon. Alternatively, the label may be displayed by using a personalized icon based on current news and historical browsing content of the user in the application 1. For example, the personalized icon may be a cover of the live streaming room or the image of the video.

The label 1031 is used to identify a function set in the application 1. The function set is used to provide an entrance to live streaming rooms. The label 1031 corresponds to the display area 104, and the label 1031 has been selected in the application 1. The display area 104 is used to enter respective live streaming rooms in the function set. The display area 104 may display the entrance of each live streaming room in the form of an icon, a text, a picture, a video, etc.

The display area 104 may include: an option 1041 and an option 1042. Each of the option 1041 and the option 1042 corresponds to an information flow (feed) of a live streaming room and are used to enter the corresponding live streaming room. In FIG. 1B, the mobile phone plays current images of the video of live streaming room 1 that is broadcasting in the option 1041 in the form of a window (i.e., displayed in a card-shaped window). The mobile phone displays a picture (e.g., a cover) of live streaming room 2 that is broadcasting in the option 1042 in the form of a window.

In addition, the display area 104 may also include other options. In addition to the option corresponding to the information flow of the live streaming room that is broadcasting, the other option may also correspond to the information flow of the live streaming room that does not broadcast. Parameters such as the number of options and an area of each option in the display area 104 may be set according to the screen size of the mobile phone.

1. Adjust Sound of the Video in the Information Flow Corresponding to the Label

In addition to playing the current image of the video of the live streaming room 1 in the option 1041, the mobile phone may play current sound of the video of the live streaming room 1 in the option 1041. A control 1051 may be displayed in the option 1041. The control 1051 is used to adjust volume of the sound of the live streaming room 1 corresponding to the option 1041.

After receiving an operation of the user on the option 1041 shown in FIG. 1B, such as clicking on control 1051, the application 1 may display the control 1052 shown in FIG. 1C exemplarily on the mobile phone, to mute the current sound of the video of the live streaming room 1. After receiving the operation of the user on the option 1041 shown in FIG. 1C, such as clicking control 1052, the application 1 may display the control 1051 exemplarily shown in FIG. 1B on the mobile phone, to unmute the current sound of the video of the live streaming room 1.

Alternatively, after the application 1 receives an operation of the user on the option 1041 shown in FIG. 1B, such as clicking on control 1051, the control 1053 exemplarily shown in FIG. 1D may be displayed on the mobile phone. After the application 1 receives the operation of the user on the option 1041 shown in FIG. 1D, such as clicking the control 1053, the mobile phone may increase or decrease the current sound of the video of the live streaming room 1.

2. Change Feed Flow Corresponding to the Label

After receiving an operation of the user, such as sliding up in the display area 104 shown in FIG. 1B, the application 1 may change the display sizes of the option 1041 and the option 1042 in the display area 104, to decrease the display size of the option 1041 and increase the display size of the option 1042.

When the display size of the option 1042 is greater than or equal to a preset value, or option 1042 slides a preset distance, the mobile phone displays a picture (such as the cover) of the live streaming room 1 that is broadcasting in the option 1041 in the form of a window, and plays the current images of the video of the live streaming room 2 that is broadcasting in the option 1042 in the form of the window. In this case, the application 1 may display the display area 104 exemplarily shown in FIG. 1E on the mobile phone. In addition, the control 1051 no longer is displayed in the option 1041, but in the option 1042.

When the option 1042 slides to a preset position (e.g., the position corresponding to option 1041 in FIG. 1B, i.e., the initial position of option 1041), the mobile phone will no longer display option 1041. The mobile phone may play current images of the video of the live streaming room 2 that is broadcasting in the option 1042 in the form of the window, and display a picture (such as the cover) of the live streaming room 3 that is broadcasting in the option 1043 in the form of the window. In this case, the application 1 may display the display area 104 exemplarily shown in FIG. 1F on the mobile phone. In addition, the control 1051 no longer is displayed in option 1041, but in the option 1042.

It should be noted that, in addition to playing the current images of the video of the live streaming room 2 in the option 1042, the mobile phone may also play current sound of the video of the live streaming room 2 in the option 1042. In addition, the specific description of adjusting the sound of the video of the live streaming room 2 in the option 1042 by the control 1051 can refer to the description of adjusting the sound of the video of the live streaming room 1 in the option 1041 in FIG. 1C to FIG. 1D by the control 1051.

In addition, the user may continue to perform an upward sliding operation in the display area 104, to display the live streaming room that has not been displayed in the display area 104 on the mobile phone. In addition, the user may continue to perform a downward sliding operation in the display area 104, to re-display the live streaming room that has been displayed in the display area 104 on the mobile phone.

3. Enter a Page Corresponding to the Option

After receiving the operation of the user on the window 102 shown in FIG. 1B, such as clicking option 1041, the application 1 may display the user interface 12 exemplarily shown in FIG. 1G on the mobile phone, and the user interface 12 is used to play the current images and sound of the video of the live streaming room 1 in full screen.

In addition, the pages corresponding to other options in the display area 104 may refer to the manner for displaying the live streaming room 1 in the option 1041 in full screen on the user interface 12, as shown in FIG. 1G. For example, the application 1 may display an introduction video of a good thing on the mobile phone in full screen. Alternatively, the application 1 may display MV of a song on the mobile phone in full screen.

The label 1032 is used to identify a function set in the application 1, and the function set is used to provide an entrance to good things recommendation. The label 1033 is used to identify a function set in the application 1, and the function set is used to provide an entrance to music recommendation. The labels correspond to respective areas. Each area is used to enter an entrance to the function set corresponding to the label.

4. Change the Label

After the preset duration, or after application 1 receives an operation of the user on the window 102 shown in FIG. 1B, such as clicking on the label 1032, the application 1 selects the label 1032. In this case, the application 1 may change the display area 104 into the display area 106 exemplarily shown in FIG. 1H.

The display area 106 is used to enter an entrance to the good things recommendation in the function set corresponding to the label 1032. The entrance of good things recommendation may be displayed in the display area 106 in the form of an icon, a text, a picture, a video or other forms.

The display area 106 may include: an option 1061 and an option 1062. The option 1061 and option 1062 corresponds to respective feed flows (feed) of the good things recommendation, which are used to enter the recommendation pages corresponding to respective good things. In FIG. 1H, the mobile phone plays images of a video of the good thing 1 in the option 1061 in the live streaming room that is broadcasting in the form of the window (i.e., displayed in a card-shaped window). The mobile phone displays a picture (such as a cover) of the good thing in the option 1062 in the form of the window.

Additionally, the display area 106 may also include other options. In addition to the above content, other options may correspond to feed flows such as shopping links and introduction videos of the good things. Parameters such as the number of options and sizes of the respective options in the display area 106 may be set according to the screen size of the mobile phone and other conditions.

It should be noted that the specific implementations of the adjustment of the sound of the video of the feed flow, the display mode of the options, and the manner for entering to the page of the good things recommendation/music recommendation and the like in the display area 106 may refer to the description of the adjustment of the sound of the video of the feed flow, the display mode of the options, and the manner for entering to the page of the good things recommendation/music recommendation in the display area 104. All the above details will not be repeated here.

In addition, after the preset duration is elapsed again, or after the application 1 receives an operation performed by the user on the window 102 shown in FIG. 1B, such as clicking on the label 1033, the application 1 may change the display area 106 into the display area corresponding to the label 1033.

Therefore, the mobile phone may perform an automatic carousel on the feed flows of the multiple labels in the window 102, based on a default mode or a mode set by the user. Alternatively, the mobile phone can manually switch the feed flows of the multiple labels in the window 102.

The display area corresponding to the label 1033 may include one or more options. Each option corresponds to a feed flow such as an image displayed when a music is played, a cover of a music, or a music video (MV) or recording.

5. Edit the Label

In FIG. 1B, the window 102 may further include: a control 1071 configured to displaying all labels. Parameters, such as the shape, the size, and the color, of the control 1071 are not limited in the present disclosure.

51. Display all Labels

After receiving an operation performed by the user on the window 102 as shown in FIG. 1B, such as clicking on the control 1071, in addition to the label 1031, the label 1032, the label 1033 and the display area 104, the application 1 may further display a label 1034 and a control 1072 in the window 102 exemplarily shown in FIG. 1I.

The label 1034 is used to identify a function set in the application 1, and the function set is used to provide an entrance to a mini program recommendation. The label 1034 corresponds to an area, and the area is used to enter the entrance of the mini program recommend.

The control 1072 is used to display a part of labels. Parameters, such as the shape, the size, and the color, of the control 1072 are not limited in the present disclosure. Generally, the display positions of the control 1071 and the control 1072 are the same.

52. Display a Part of Labels

After receiving the operation performed by the user on the window 102 shown in FIG. 1I, such as clicking on the control 1072, the application 1 may display the window 102 exemplarily shown in FIG. 1B on the mobile phone.

It should be noted that after the application 1 receives the operation performed by the user on the user interface 11 shown in FIG. 1A, such as clicking on the control 101, the application 1 may display the window 102 exemplarily shown in FIG. 1I on the user interface 11, rather than the window 102 exemplarily shown in FIG. 1B on the user interface 11.

Therefore, the application 1 may display multiple labels in a single line, or in multiple lines, which enriches the display manners of labels.

53. Add a New Label

In addition, a label 1035 may be included in FIG. 1I. The label 1035 is used to add a new label. Parameters, such as the shape, the size, and the color, of the label 1035 are not limited in the present disclosure.

After receiving an operation performed by the user on the window 102 shown in FIG. 1I, such as clicking on the label 1035, the mobile phone may select one or more new label on the option page, such as label 1036. In this case, in addition to the label 1031, the label 1032, the label 1033, the display area 104, the label 1034 and the label 1035, the application 1 may display the label 1036 in the window 102, as exemplarily shown in FIG. 1J.

The label 1036 is used to identify a function set in the application 1, and the function set is used to provide an entrance to sign-in. Label 1036 corresponds to an area, which is used to enter a recommendation entry to sign-in.

After receiving an operation performed by the user on the window 102 shown in FIG. 1J, such as long pressing the label 1036, the window 102 enters a label editing mode, i.e., exiting the label non-editing mode. In this case, the application 1 may display the window 102 in the label editing mode as exemplarily shown in FIG. 1K on the mobile phone. A control 1073 is added at the lower right corner of each label. The control 1073 is used to delete the corresponding label. In addition, the label 1035 is no longer displayed.

54. Change the Position of the Label

After receiving an operation performed by the user on the window 102 shown in FIG. 1K, such as an operation for moving the label 1034 to the position of label 1036, the application 1 may display the window 102 as exemplarily shown in FIG. 1L on the mobile phone, in which the positions of the label 1034 and the label 1036 in the window 102 are swapped.

55. Delete a Label

After receiving an operation performed by the user on the window 102 shown in FIG. 1K, such as clicking on the control 1073 in the lower right corner of the label 1034, the application 1 may display the window 102 as exemplarily shown in FIG. 1M on the mobile phone, in which the label 1034 is deleted from the window 102.

56. Exit Label Edit Mode

After receiving an operation performed by the user on the window 102 shown in FIG. 1K, such as a clicking operation, the window 102 exits the label editing mode, i.e., entering the label non-editing mode. In this case, the application 1 may display the window 102 in the label non-editing mode as exemplarily shown in FIG. 1N on the mobile phone. The control 1073 added to the lower right corner of each label is no longer displayed, and the label 1035 is displayed.

It should be noted that, in the label non-editing mode, the label 1035 may not be displayed in the window 102 shown in FIG. 1I. In the label editing mode, a label 1035 may be displayed in the window 102 shown in FIG. 1K.

Based on the above description, the application 1 may display labels with multiple function sets to the user through a page corresponding to one entrance (using the sidebar style), so that the user can quickly determine the functions of multiple function sets. In addition, the application 1 can play the feed flow in the function set corresponding to the label to the user. Thus, the user can obtain a rich and stereoscopic function set, the page space corresponding to the entrance is fully utilized, and the convenience for the user using the application 1 is improved. Moreover, while the application 1 displays the page, it can still execute the function corresponding to the previous page (playing multimedia information) simultaneously.

In addition, the application 1 may manually switch or automatically alternate to the feed flow corresponding to the next label among the multiple labels, so that the user can accurately acquire the content that the user is interested in or news.

In addition, application 1 may display multiple labels in a display manner of a single line or multiple lines, which enriches the diversity of displaying multiple labels. Moreover, each label may be related to content such as the historical browsing records of the user in application 1, current trending news, the region of the user, etc. Thus, the application 1 can display the label for each function set in a personalized manner.

In addition, the application 1 can edit the positions and quantities of multiple labels, such as adding labels, deleting labels, changing the positions of labels, etc.

Based on the description of the embodiments in FIGS. 1A to 1N, in conjunction with FIG. 2, the specific implementation process of a method for displaying an application page provided by the present disclosure will be described in detail.

Figure 2:
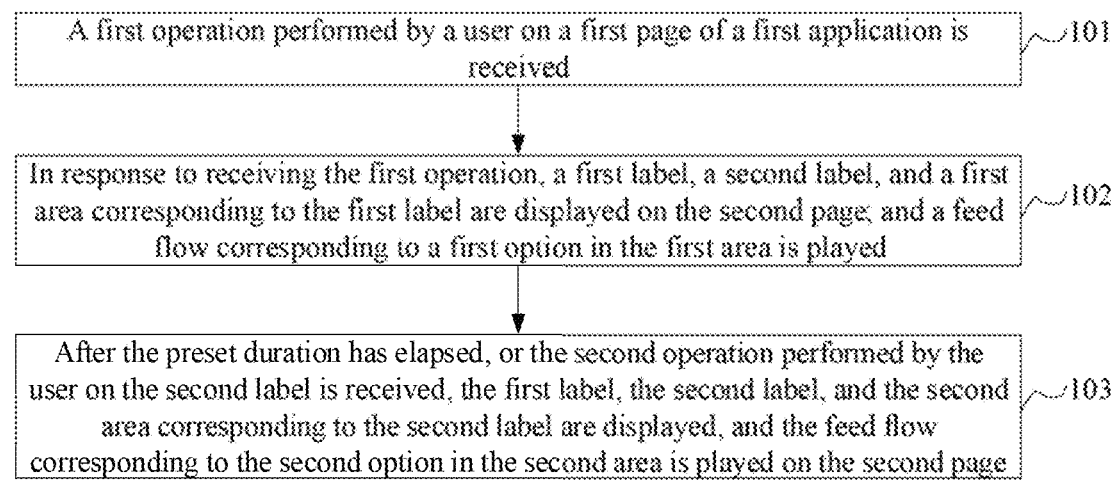
FIG. 2 is a flowchart of a method for displaying an application page according to an embodiment of the present disclosure.

Referring to FIG. 2, FIG. 2 is a flowchart of a method for displaying an application page according to an embodiment of the present disclosure. As shown in FIG. 2, the method for displaying the application page in the present disclosure may include steps S101 to S103.

In S101, a first operation performed by a user on a first page of a first application is received.

An entrance of the second page corresponding to the first operation is configured on the first page of the first application. Therefore, the electronic device may receive the first operation performed on the first page.

The first page may be a page of the first application. For example, the first page may be a home page of the first application, or a page in the first application other than the home page.

The first operation is used to enter the second page of the first application. The first operation may include, but be not limited to, click, double click, long press, slide and other types of operations. For example, the first operation may be an operation on a certain control on the first page, or an operation that satisfies a preset gesture. For example, the operation, may be performed by the user on the mobile phone screen, such as sliding right/sliding left/pulling up/pulling down.

The second page is a page of the first application except the first page, and the first page is different from the second page. However, content of the first page may be the same as or different from content of the second page, which is not limited in the present disclosure. For example, the second page may displayed in a sidebar style to cover a part of the first page, so that the labels with multiple function sets and the feed flow of option in one function set can be displayed regionally on the second page. Parameters, such as the size, the position, and an area of the region for covering the first page with the second page are not limited in the present disclosure.

In some embodiments, in the case that the first application is the application 1 in FIG. 1A to FIG. 1N, the specific implementation of the first page may refer to the description of the user interface 11 in the embodiments of FIG. 1A. The specific implementation of the first operation may refer to the description of the user clicking the control 101 in the embodiments of FIG. 1A. The specific implementation of the second page may refer to the description of the window 102 in the embodiments of FIG. 1B or FIG. 1. All the above details will not be repeated here.

In S102, in response to receiving the first operation, a first label, a second label, and a first area corresponding to the first label are displayed on the second page; and a feed flow corresponding to a first option in the first area is played.

After receiving the first operation, the electronic device displays the first label, the second label, and the first area corresponding to the first label on the second page; and plays the feed flow corresponding to the first option in the first area.

The first label (label) is used to identify the function of each option in the first area, and the first label is different from the second label. In some embodiments, the first label or the option in the first label are displayed at preset positions on the second page. That is, the position of the first label on the second page is fixed, and the position of the first option on the second page is also fixed.

The functions identified by the first label and the second label are different. One or more options are set in the first area corresponding to the first label, and each option is used to display a feed flow in the function set corresponding to the first label. The feed flow here can be understood as a video segment, such as a video of a live streaming room, or a video introducing a good thing, or a MV of a song.

Parameters, such as the position, the size, and the color, of the first area on the second page are not limited in the present disclosure. For example, the first label is the first one of labels on the second page, and the first option is the first one of options in the first area.

In addition, display content and display style of the first label or the option in the first label may be based on the historical browsing records of the user in the first application, current trending news, the region of the user and other related content, so that the first application can display the first label in a personalized manner, and display a feed flow close to the behavior and habit of the user in the first option.

In some embodiments, the specific implementation of the first label may refer to the description of the label 1031 in FIGS. 1B to 1F and FIGS. 1I to 1N. Correspondingly, the specific implementation of the second label may refer to the description of one of the labels 1032, 1033, 1034 and 1036 in FIGS. 1B to 1F and FIGS. 1I to 1N. The specific implementation of the first area corresponding to the first label may refer to the description of the display area 104 in FIGS. 1B to 1F and FIGS. 1I to 1N, which will not be repeated.

Correspondingly, the first option in the first area may refer to the description of option 1041 in the display area 104 in FIGS. 1B to 1D and FIGS. 1I to 1N. The specific implementation of the feed flow corresponding to the first option in the first area may refer to the description of the feed flow corresponding to option 1041 in FIGS. 1B-1D and FIGS. 1I-1N. All the above details will not be repeated here.

Correspondingly, the first option in the first area may refer to the description of option 1042 in the display area 104 in FIGS. 1E and 1F. The specific implementation of the feed flow corresponding to the first option in the first area may refer to the description of the feed flow corresponding to the option 1042 in the display area 104 in FIGS. 1E and 1F. All the above details will not be repeated here.

In some other embodiments, the specific implementation of the first label may refer to the description of the label 1032 in FIG. 1H. Correspondingly, the specific implementation of the second label may refer to the description of one of the label 1031, label 1033, label 1034 and label 1036 in FIG. 1H. The specific implementation of the first label corresponding to the first area may refer to the description of display area 106 in FIG. 1H. The first option in the first area may refer to the description of the option 1061 in the display area 106 in FIG. 1H. The specific implementation of the feed flow corresponding to the first option in the first area may refer to the description of the feed flow corresponding to the option 1061 in FIG. 1H. All the above details will not be repeated here.

In some examples, when a preset condition is met, a display of the second area corresponding to the second label on the second page may be switched to. The preset condition may be: elapsing a preset duration, or receiving a second operation performed by the user on the second label.

In S103, after the preset duration has elapsed, or the second operation performed by the user on the second label is received, the first label, the second label, and the second area corresponding to the second label are displayed, and the feed flow corresponding to the second option in the second area is played on the second page.

The electronic device can automatically replace the first area corresponding to the first label with the second area corresponding to the second label on the second page after the preset duration. Thus, the electronic device can display the first label, the second label and the second area corresponding to the second label on the second page and play the feed flow corresponding to the second option in the second area.

The specific value of the preset duration is not limited in the present disclosure.

Alternatively, after receiving the second operation, the electronic device can manually replace the first area corresponding to the first label with the second area corresponding to the second label on the second page. Thus, the electronic device can display the first label, the second label and the second area corresponding to the second label on the second page and play the feed flow corresponding to the second option in the second area.

The second operation is used to change the label. The second operation may include, but be not limited to, click, double click, long press, slide and other types of operations. For example, the second operation may be an operation on a certain label, or an operation satisfying the preset gesture.

The second label is used to identify the function of each option in the second area. In some embodiments, the second label or the option in the second label are displayed at preset positions of the second page. That is, the position of the second label on the second page is fixed, and the position of the second option on the second page is also fixed. For example, the second option is the first one of options in the second area.

In addition, the display manners of the first label and the second label are not limited in the present disclosure. In some embodiments, the first label and the second label are displayed on the second page in a single line or in multiple lines. Hence, the manners of displaying multiple labels on the second page may be enriched.

One or more options are set in the second area corresponding to the second label, and one option is used to display one feed flow in the function set corresponding to the second label. The feed flow here can be understood as a video segment, such as a video of a live streaming room, or a video introduction of a good thing, or a MV of a song.

Parameters, such as the position, the size, and the color, of the second area on the second page are not limited in the present disclosure. In some embodiments, the positions of the first area and the second area on the second page may be the same.

In addition, the display content and display style in the second label or the option of the second label may be based on the historical browsing records of the user in the first application, current trending news, the region of the user and other related content, so that the first application can display the second label in a personalized manner, and display a feed flow close to the behavior and habit of the user in the second option.

In some embodiments, the specific implementation of the second operation may refer to the description of the user clicking on the label 1032 in the embodiment of FIG. 1B. The specific implementation of the second label may refer to the description of the label 1032 in FIG. 1H. The specific implementation of the second area corresponding to the second label may refer to the description of the display area 106 in FIG. 1H. The second option in the second area may refer to the description of the option 1061 in the display area 106 in FIG. 1H. The specific implementation of the feed flow corresponding to the second option may refer to the description of the feed flow corresponding to the option 1061 in FIG. 1H. All the above details will not be repeated here.

In the method for application page display provided by the present disclosure, in response to receiving the first operation performed by the user on the first page of the first application, the electronic device can display multiple labels and the first area corresponding to the first label on the second page, and play the feed flow in the function set corresponding to the first area. After the preset duration, or after receiving the second operation performed by the user on the second label, the electronic device can display multiple labels and the second area corresponding to the second label on the second page, and play the feed flow in the function set corresponding to the second area. In this way, the space of one page is fully utilized to be compatible with the display of multiple function sets and the feed flow of one function set. Thus, users can clarify the functions of functions set as much as possible, and can automatically or manually acquire the video content such as the content that the user is interested in or the current news in each function set, which is beneficial for the application program to display the function sets in an enriched and stereoscopic manner, and improves the user experience for the application program.

In addition, when the first page corresponds to multimedia information of the first application, the electronic device may continue playing the multimedia information on the first page while displaying the second page, so as to maintain the playing state of the multimedia information.

Based on the foregoing description, when the first area further includes the third option, the electronic device can play the feed flow corresponding to the first option and display a picture image in the feed flow corresponding to the third option.

The third option may be an option in the first area corresponding to the first label, the first option is different from the third option. The third option is used to display a feed flow in the function set corresponding to the first label.

In some embodiments, the first option in the first area may refer to the description of option 1041 in the display area 104 in FIGS. 1B to 1D and FIGS. 1I to 1N. Correspondingly, the third option may refer to the description of the option 1042 in the display area 104 in FIGS. 1B to 1D and FIGS. 1I to 1N. The specific implementation of the feed flow corresponding to the second option in the first area may refer to the description of the feed flow corresponding to the option 1042 in FIGS. 1B to 1D and FIGS. 1I to 1N. All the above details will not be repeated here.

In some other embodiments, the first option in the first area may refer to the description of option 1042 in the display area 104 in FIGS. 1E to 1F. Correspondingly, the third option in the first area may refer to the description of option 1041 or option 1043 in the display area 104 in FIGS. 1E to 1F. The specific implementation of the feed flow corresponding to the second option in the first area may refer to the description of the feed flow corresponding to the option 1041 or option 1043 in the display area 104 in FIGS. 1E to 1F. All the above details will not be repeated here.

In some other embodiments, the first option in the first area may refer to the description of the option 1061 in the display area 106 in FIG. 1H. The second option in the first area may refer to the description of the option 1062 in the display area 106 in FIG. 1H. The specific implementation of the feed flow corresponding to the first option in the first area may refer to the description of the feed flow corresponding to the option 1061 in FIG. 1H. The specific implementation of the feed flow corresponding to the second option in the first area may refer to the description of the feed flow corresponding to the option 1062 in FIG. 1H. All the above details will not be repeated here.

Based on the foregoing description, when the first area includes the first option and the third option, the electronic device may change the feed flow in the function set corresponding to the first label.

In some embodiments, the electronic device may receive a third operation performed by the user on the second page. The third operation may be used to replace the played feed flow corresponding to one option with a feed flow corresponding to another option. The third operation may include, but be not limited to, click, double click, long press, slide and other types of operations. For example, the third operation may be an operation acting on a certain control in the option, or an operation satisfying a preset gesture.

In some embodiments, the specific implementation of the third operation may refer to the description of the upward sliding operation performed by the user in the embodiment of FIG. 1B, which is not limited here.

The third operation may be an operation of increasing a display size of the third option in the first area to be greater than or equal to a preset value. The preset value is not limited in the present disclosure. For example, the preset value is equal to the entire area of the third option.

Alternatively, the third operation may also be an operation for moving the third option a distance greater than or equal to a preset distance. A value of the preset distance is not limited in the present disclosure. For example, the preset distance is half of the length of the third option.

Alternatively, the third operation may be an operation for moving the third option to a preset position in the first area. The preset position is a position where the feed flow corresponding to the first option in the first area is located in the case that the feed flow corresponding to the first option is played and the picture image in the feed flow corresponding to the third option is displayed. In some examples, the preset position may be the initial position of the feed flow corresponding to the first option in the first area.

Hence, after receiving the third operation, the electronic device can update, from a play of the feed flow corresponding to the first option and a display of a picture image in the feed flow corresponding to the third option, to a display of a picture image in the feed flow corresponding the first option and a play of the feed flow corresponding to the third option.

In addition, in the sliding process of the third option, the first application may configure an absorb effect, and play the feed flow corresponding to the first option in the first area in default. In this way, after receiving the third operation, the electronic device can pick up the third option and display it to the position of the first option, so that the third option can be fully displayed on the second page, and automatically play the feed flow corresponding to the third option.

In some examples, the feed flow may include the images and sound of the video. In other examples, the feed flow may include the images of the video. For the step S102 of playing the feed flow corresponding to the first option in the first area, or the step S103 of playing the feed flow corresponding to an option in the playing the feed flow corresponding to the second option in the second area, the electronic device can play the images of the video and sound of the video of the feed flow corresponding to the option, or play the images of the video of the feed flow corresponding to an option without the sound.

Based on the above description, the electronic device may also adjust the sound of the video of the feed flow corresponding to the option. In some embodiments, the electronic device may receive a fourth operation performed by the user on the display area of an option. After receiving the fourth operation, the electronic device may reduce, increase or mute the sound of the video of the feed flow corresponding to the option. For example, in response to receiving a fourth operation performed by the user on an option in the first area or the second area, the electronic device may reduce, increase or mute the sound of the video of the feed flow corresponding to the option in the first area or the second area.

The fourth operation is used to adjust the sound of the video of the feed flow corresponding to an option. The fourth operation may include, but be not limited to, click, double click, long press, slide and other types of operations. For example, the fourth operation may be an operation acting on a certain control in the option, or an operation satisfying a preset gesture.

In some embodiments, the specific implementation of the fourth operation may refer to the description of the user clicking the control 1051 in the embodiment of FIG. 1B. Alternatively, the specific implementation of the fourth operation may refer to the description of the user clicking the control 1052 in the embodiment of FIG. 1C. The specific implementation of the fourth operation may refer to the description of the user clicking the control 1053 in the embodiment of FIG. 1D, which is not limited here.

Based on the foregoing description, when multiple labels are displayed on the second page, the position, size and quantity of the multiple labels may be editable in the present disclosure.

The electronic device may delete the displayed label on the second page. In some embodiments, a first control may further be displayed on the second page, and the first control is used to delete a label. Parameters, such as the shape, the size, the position, and the color, of the first control are not limited in the present disclosure. The electronic device may receive a fifth operation performed by the user on the first control. The fifth operation is used to delete the label. The fifth operation may include but not limited to click, double click, long press, slide and other types of operations. For example, the fifth operation may be an operation acting on the first control, or an operation satisfying a preset gesture. In this way, after receiving the fifth operation, the electronic device may delete the first label on the second page.

In some embodiments, the specific implementation of the first control may refer to the description of the control 1073 in the embodiment of FIG. 1K. The specific implementation of the fifth operation may refer to the description of the user clicking on the control 1073 in the embodiment of FIG. 1K. The specific implementation of deleting the first label may refer to the description of the user deleting the label 1034 in the embodiment of FIG. 1M, which is not limited here.

On the second page, the electronic device may add a label that has not been displayed. In some embodiments, a second control may further be displayed on the second page. The second control is used to add a new label. Parameters, such as the shape, the size, the position, and the color, of the second control are not limited in the present disclosure. The electronic device may receive a sixth operation performed by the user on the second control. The sixth operation is used to add the new label. The sixth operation may include, but be not limited to, click, double click, long press, slide and other types of operations. For example, the sixth operation may be an operation acting on the second control, or an operation satisfying a preset gesture. Therefore, after receiving the sixth operation, the electronic device may display a third label on the second page, where the third label is different from the first label and the second label.

In some embodiments, the specific implementation of the second control may refer to the description of the label 1035 in the embodiment of FIG. 1I. The specific implementation of the sixth operation may refer to the description of the user clicking the label 1035 in the embodiment of FIG. 1I. The specific implementation of the third label may refer to the description of the user clicking on the label 1036 in the embodiment of FIG. 1J. All the above details are not limited here.

The electronic device may move the position of the displayed label on the second page. In some embodiments, the electronic device may receive a seventh operation performed by the user on the first label. The seventh operation is used to move the position of the label. The seventh operation may include, but be not limited to, click, double click, long press, slide and other types of operations. For example, the seventh operation may be an operation satisfying a preset gesture. Therefore, after receiving the seventh operation, the electronic device may exchange the positions of the first label and the second label on the second page.

In some embodiments, the specific implementation of the seventh operation may refer to the description of the operation for the user moving the label 1034 to the position of the label 1036 in the embodiment of FIG. 1K. The specific implementation of exchanging the position of the first label and the second label may refer to the description of exchanging positions of the label 1034 and the label 1036 in the window 102 in the embodiment of FIG. 1L. All the above details are not limited here.

The electronic device may display all labels on the second page. In some embodiments, a third control may further be displayed on the second page. The third control is used to display all labels. Parameters, such as the shape, the size, the position, and the color, of the third control are not limited in the present disclosure. The electronic device may receive an eighth operation performed by the user on the third control. The eighth operation is used to display all labels. The eighth operation may include, but be not limited to, click, double click, long press, slide and other types of operations. For example, the eighth operation may be an operation acting on the third control, or an operation satisfying a preset gesture. Therefore, after the electronic device receives the eighth operation, it may update, from a display of the first label and the second label on the second page, to a display of the first label, the second label and the fourth label on the second page, where the four label is different from the first label and the second label.

In some embodiments, the specific implementation of the third control may refer to the description of the operation of the control 1071 in the embodiment of FIG. 1B. The specific implementation of the eighth operation may refer to the description of the user clicking the control 1071 in the embodiment of FIG. 1B. The specific implementation of displaying the first label, the second label and the fourth label may refer to the description of the label 1031, label 1032, label 1033 and label 1034 in the embodiment of FIG. 1I. All the above details are not limited here.

The electronic device may display a part of the labels on the second page. In some embodiments, a fourth control may further be displayed on the second page. The fourth control is used to display some labels and hide the others. Parameters, such as the shape, the size, the position, and the color, of the fourth control are not limited in the present disclosure. The electronic device may receive a ninth operation performed by the user on the fourth control. The ninth operation is used to display a part of labels. The ninth operation may include, but be not limited to, click, double click, long press, slide and other types of operations. For example, the ninth operation may be an operation acting on the fourth control, or an operation satisfying a preset gesture. Therefore, after receiving the ninth operation, the electronic device may update, from a display of the first label and the second label on the second page, to a display of the first label on the second page.

In some embodiments, the specific implementation of the fourth control may refer to the description of the operation of the control 1072 in the embodiment of FIG. 1I. The specific implementation of the ninth operation may refer to the description of the operation of the user clicking the control 1072 in the embodiment of FIG. 1I. The specific implementation of displaying the first label may refer to the description of the label 1031, label 1032 and label 1033 in the embodiment of FIG. 1B. All the above details will not be repeated here.

In addition, the electronic device may also enter pages corresponding to the respective options in the first area and the respective options in the second area. The electronic device may enter a page corresponding to an option, in response to receiving an operation performed by the user on the option. In some embodiments, the above specific implementation process may refer to the description of a live streaming room displayed on the user interface 12 in FIG. 1G, which will not be repeated here.

Exemplarily, an electronic device is provided according to the present disclosure, the electronic device includes: one or more processors; a memory; and one or more computer programs, where the one or more computer programs are stored in the memory. The one or more computer programs, when executing the one or more processors, cause the electronic device to implement the method for displaying the application page according to the foregoing embodiments.

Exemplarily, a chip system is provided according to the present disclosure, which is applied to an electronic device including a memory and a sensor. The chip system includes: a processor which implements the method for displaying the application page according to the foregoing embodiments.

Exemplarily, a computer readable storage medium is provided according to the present disclosure, on which a computer program is stored. The computer program, when executed by a processor, causes an electronic device to implement the method for displaying the application page according to the foregoing embodiments.

Exemplarily, a computer program product is provided according to the present disclosure. The computer program product, when running on a computer, causes the computer to implement the method for displaying the application page according to the foregoing embodiments.

In the above embodiments, all or part of the functions may be implemented by software, hardware, or a combination of software and hardware. When implemented by software, it may be implemented in whole or in part in the form of a computer program product. A computer program product includes one or more computer instructions. When the computer program instructions are loaded and executed on the computer, the processes or functions according to the embodiments of the present disclosure are produced in whole or in part. A computer may be a general purpose computer, special purpose computer, computer network, or other programmable device. Computer instructions may be stored on a computer readable storage medium. The computer readable storage medium may be any available medium that can be accessed by a computer, or a data storage device such as a server, a data center, etc. integrated with one or more available media. The available media may be magnetic media (e.g., floppy disk, hard disk, magnetic tape), optical media (e.g., DVD), or semiconductor media (e.g., solid state disk (SSD)) and the like.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the scope of the present disclosure. Therefore, the present disclosure is not limited to the embodiments illustrated herein, rather, should be defined by the broadest scope consistent with the principle and novel features disclosed herein.

The invention claimed is:

1. A method for display an application page, comprising:
receiving a first operation performed by a user on a first page of a first application, wherein the first operation is configured to enter a second page of the first application, wherein the first page is different from the second page;
displaying the second page in response to the first operation,
wherein the second page covers a partial area of the first page, and the first page is partially displayed after the second page is displayed wherein the second page comprises a first label, a second label, and a first area corresponding to the first label and a feed flow corresponding to a first option is played in in the first area, and wherein a function identified by the first label is different from a function identified by the second label; and
switching from a display of the first area to a display of a second area corresponding to the second label on the second page in response to elapsing of a preset duration, wherein a feed flow corresponding to a second option is played in the second area.

2. The method according to claim 1, wherein the first area and the second area are located at the same position on the second page.

3. The method according to claim 1, wherein in a case that the first area further comprises a third option different from the first option, the playing the feed flow corresponding to the first option in the first area comprises:
playing the feed flow corresponding to the first option in the first area; and displaying a picture image in a feed flow corresponding to the third option in the first area.

4. The method according to claim 3, further comprising:
receiving a third operation performed by the user on the second page; and
switching, in response to receiving the third operation, from a play of the feed flow corresponding to the first option in the first area and a display of the picture image in the feed flow corresponding to the third option in the first area, to a display of a picture image in the feed flow corresponding to the first option in the first area and a play of the feed flow corresponding to the third option in the first area.

5. The method according to claim 4, wherein the third operation is an operation for increasing a display size of the third option in the first area to be greater than or equal to a preset value; or
the third operation is an operation for moving the third option to a preset position in the first area.

6. The method according to claim 5, wherein the preset position is a position where the feed flow corresponding to the first option is located in the first area, in a case that the feed flow corresponding to the first option is played and the picture image in the feed flow corresponding to the third option is displayed.

7. The method according to claim 1, wherein playing a feed flow corresponding to an option comprises:
 playing images and sound of a video of the feed flow corresponding to the option; or
 playing images of a video of the feed flow corresponding to the option.

8. The method according to claim 1, further comprising:
 receiving a fourth operation performed by the user on an option in the first area or the second area; and
 decreasing, increasing or muting sound of a video of the feed flow corresponding to the option in the first area or the second area, in response to receiving the fourth operation.

9. The method according to claim 1, wherein the first label is a first one of labels on the second page, the first option is a first one of options in the first area, and the second option is a first one of options in the second area.

10. The method according to claim 1, wherein any one of the first label, the second label, the first option and the second option is displayed at a preset position of the second page.

11. The method according to claim 1, wherein the first label and the second label are displayed on the second page in a single line or in multiple lines.

12. The method according to claim 1, wherein options in the first label and the second label are related to historical browsing records of the user in the first application; and
 the first label and the second label are related to the historical browsing records of the user in the first application.

13. An electronic device, comprising:
 one or more processors;
 a memory; and
 one or more computer programs;
 wherein the one or more computer programs are stored in the memory; and the one or more computer programs, when executed by the one or more processors, cause the electronic device to:
  receive a first operation performed by a user on a first page of a first application,
   wherein the first operation is configured to enter a second page of the first application, and
   wherein the first page is different from the second page;
  display the second page in response to the first operation,
   wherein the second page covers a partial area of the first page, and the first page is partially displayed after the second page is displayed, wherein the second page comprises a first label, a second label, and a first area corresponding to the first label; and
  a feed flow corresponding to a first option is played in the first area, and
   wherein a function identified by the first label is different from a function identified by the second label; and
  switch from a display of the first area to a display of a second area corresponding to the second label on the second page in response to elapsing of a preset duration, wherein a feed flow corresponding to a second option is played in the second area.

14. The electronic device according to claim 13, wherein the first area and the second area are located at the same position on the second page.

15. The electronic device according to claim 13, wherein in a case that the first area further comprises a third option different from the first option, the one or more computer programs, when executed by the one or more processors, cause the electronic device to:
 play the feed flow corresponding to the first option in the first area; and display a picture image in a feed flow corresponding to the third option in the first area.

16. The electronic device according to claim 15, wherein the one or more computer programs, when executed by the one or more processors, cause the electronic device to:
 receive a third operation performed by the user on the second page; and
 switch, in response to receiving the third operation, from a play of the feed flow corresponding to the first option in the first area and a display of the picture image in the feed flow corresponding to the third option in the first area, to a display of a picture image in the feed flow corresponding to the first option in the first area and a play of the feed flow corresponding to the third option in the first area.

17. The electronic device according to claim 16, wherein the third operation is an operation for increasing a display size of the third option in the first area to be greater than or equal to a preset value; or
 the third operation is an operation for moving the third option to a preset position in the first area.

18. A non-transitory computer storage medium, wherein the computer storage medium comprises computer instructions; and the computer instructions, when running on an electronic device, cause the electronic device to:
 receive a first operation performed by a user on a first page of a first application,
  wherein the first operation is configured to enter a second page of the first application, wherein the first page is different from the second page;
 display the second page in response to the first operation,
  wherein the second page covers a partial area of the first page, and the first page is partially displayed after the second page is displayed, wherein the second page comprises a first label, a second label, and a first area corresponding to the first label on the second page, and a feed flow corresponding to a first option is played in the first area, and wherein a function identified by the first label is different from a function identified by the second label; and
 switch from a display of the first area to a display of a second area corresponding to the second label on the second page in response to elapsing of a preset duration, wherein a feed flow corresponding to a second option is played in the second area.

* * * * *